(12) United States Patent
Larkins

(10) Patent No.: US 6,295,291 B1
(45) Date of Patent: *Sep. 25, 2001

(54) SETUP OF NEW SUBSCRIBER RADIOTELEPHONE SERVICE USING THE INTERNET

(75) Inventor: John P. Larkins, Allen, TX (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,865

(22) Filed: Jul. 31, 1997

(51) Int. Cl.[7] .............................. H04L 12/66; H04Q 7/00
(52) U.S. Cl. ........................ 370/352; 370/329; 455/411; 709/219; 709/227
(58) Field of Search ................................. 370/313, 352, 370/401, 409, 329; 455/415, 411, 418, 432; 709/227, 206, 229, 219; 379/88.13, 201, 130; 380/51; 701/201; 705/400, 26; 713/201; 382/233

(56) References Cited

U.S. PATENT DOCUMENTS

| | | | |
|---|---|---|---|
| 5,608,786 | * | 3/1997 | Gordon ................................. 370/352 |
| 5,623,601 | * | 4/1997 | Vu ........................................ 713/201 |
| 5,675,507 | * | 10/1997 | Bobo, II .............................. 709/206 |
| 5,703,940 | * | 12/1997 | Sattar et al. ........................ 379/201 |
| 5,732,074 | * | 3/1998 | Spaur et al. ......................... 370/313 |
| 5,737,395 | * | 4/1998 | Irribarren .......................... 379/88.13 |
| 5,742,668 | * | 4/1998 | Pepe et al. ........................... 455/415 |
| 5,768,267 | * | 6/1998 | Raith et al. ......................... 370/329 |
| 5,864,757 | * | 1/1999 | Parker ................................. 455/418 |
| 5,867,661 | * | 2/1999 | Bittinger et al. ................... 709/227 |
| 5,956,636 | * | 9/1999 | Lipsit ................................... 455/411 |
| 5,958,016 | * | 9/1999 | Chang et al. ........................ 709/229 |
| 6,014,651 | * | 1/2000 | Crawford ............................. 705/400 |
| 6,029,195 | * | 2/2000 | Herz .................................... 709/219 |
| 6,047,051 | * | 4/2000 | Ginzboorg et al. ................ 379/130 |
| 6,061,346 | * | 5/2000 | Nordman ............................. 370/352 |

FOREIGN PATENT DOCUMENTS

| | | |
|---|---|---|
| 0 804 045 A | 10/1997 | (EP) . |
| 97 08906 A | 3/1997 | (WO) . |

OTHER PUBLICATIONS rfc1789.htm "INETPhone: Telephone Services and Servers on Internet", C. Yang, 6 pages, Apr. 1995.*

RFC 1727 "A Vision of an Integrated Internet Information Service", C. Weider, 8 pages, Dec. 1994.*

* cited by examiner

Primary Examiner—Hassan Kizou
Assistant Examiner—John Pezzlo
(74) Attorney, Agent, or Firm—John D. Crane

(57) ABSTRACT

A potential radiotelephone service subscriber logs on to a world wide web server (105) using an internet access device (101). The potential subscriber is presented with a plurality of selectable radiotelephone services and features. The potential subscriber then provides the billing system (130) with credit information that is validated through the credit validation system (140). A radiotelephone service profile is stored in the home location register (110) after the subscription process has been completed. The subscriber is then instructed to power up the radiotelephone that then registers with the system. An over-the-air activation function (135) collects data from the billing system (130) and an authentication center (125) and sends the data to the mobile switching center (115) that then transmits it through the base station (120) to the radiotelephone. The radiotelephone reprograms its own registers with the appropriate data.

1 Claim, 4 Drawing Sheets

Welcome Mr. or Mrs.

Your current service options are shown below. Please make changes and then click SUBMIT. You will have a chance to confirm your selections before accepting them. Click here to see your monthly bill.

Service Plan

Current Billing Option is Corporate Rate 1    (no change) ☐    ◇ no change   ◇ REMOVE Long Distance Carrier is MCI    (no change) ☐    ◇ no change   ◇ ADD
   ◇ no change   ◇ ADD
   ◇ no change   ◇ ADD Roaming is    Fully Enabled    (no change) ☐    ◇ no change   ◇ ADD
   ◇ no change   ◇ ADD

Basic Features

| | | | |
|---|---|---|---|
| ☑ Call Waiting | ☐ Short Message Service | ◇ no change | ◇ ADD |
| ☐ Conference Calling | ☑ Detailed Billing | ◇ no change | ◇ REMOVE |
| ☐ Call Transfer | ☑ Call Forwarding | ◇ no change | ◇ REMOVE |
| ☐ Voice Mail Box | ☐ International Dialing | ◇ no change | ◇ ADD |
| ☐ Visual Message Waiting Indicator | | | |
| ☐ Caller ID | ☐ Voice-Activated Dialing | ◇ no change | ◇ ADD |
| ☐ Private Number | ☐ Paging | ◇ no change | ◇ ADD |

*FIG. 5*

SETUP OF NEW SUBSCRIBER RADIOTELEPHONE SERVICE USING THE INTERNET

BACKGROUND OF THE INVENTION

I. Field of the Invention

The present invention relates to radiotelephone service provision. More particularly, the present invention relates to subscribing to radiotelephone service over the internet.

II. Description of the Related Art

The number of cellular radiotelephones being sold is increasing dramatically. These radiotelephones must be programmed with data from the service provider in order to operate in the service provider's area of coverage.

Typically, a potential radiotelephone service subscriber purchases a radiotelephone from a retailer. The retailer then calls a service provider in order to activate the radiotelephone for the subscriber. The service provider typically pays the retailer to provide this service for the subscriber.

There is a previously unforeseen need for a system that enables a potential subscriber to purchase radiotelephone service and various features from the service provider without retailer interaction. There is also a need for a process to operate this system in an efficient manner.

SUMMARY OF THE INVENTION

The present invention encompasses a system and method for providing radiotelephone service to a radiotelephone. The present invention uses an internet access device to access an internet coupled world wide web server. The server provides a web page that displays and makes available a plurality of radiotelephone services and features.

The potential radiotelephone service subscriber logs on to the internet coupled server with the internet access device and selects from the plurality of radiotelephone services and features. The selected features and services are saved as the radiotelephone profile.

Any credit information entered by the potential subscriber is verified with a credit validation system. The billing information provided by the potential subscriber is then saved in his billing system profile.

The radiotelephone is powered up at which time it sends out registration information to the system. The system receives the registration information from the radiotelephone and looks up the appropriate radiotelephone service profile.

The system then transmits the radiotelephone service profile to the radiotelephone. The radiotelephone uses this profile, that includes a permanent directory number, to reprogram the appropriate radiotelephone registers so that the radiotelephone can now access the service provider's system.

BRIEF DESCRIPTION OF THE DRAWINGS

FIG. 5 shows a profile management feature selection page.

DETAILED DESCRIPTION OF THE PREFERRED EMBODIMENT

The processes and system of the present invention enables a potential radiotelephone subscriber to set up service with a radiotelephone service provider. Using an internet access device, the potential subscriber can contact the service provider over the internet and subscribe to radiotelephone service.

Figure 1:
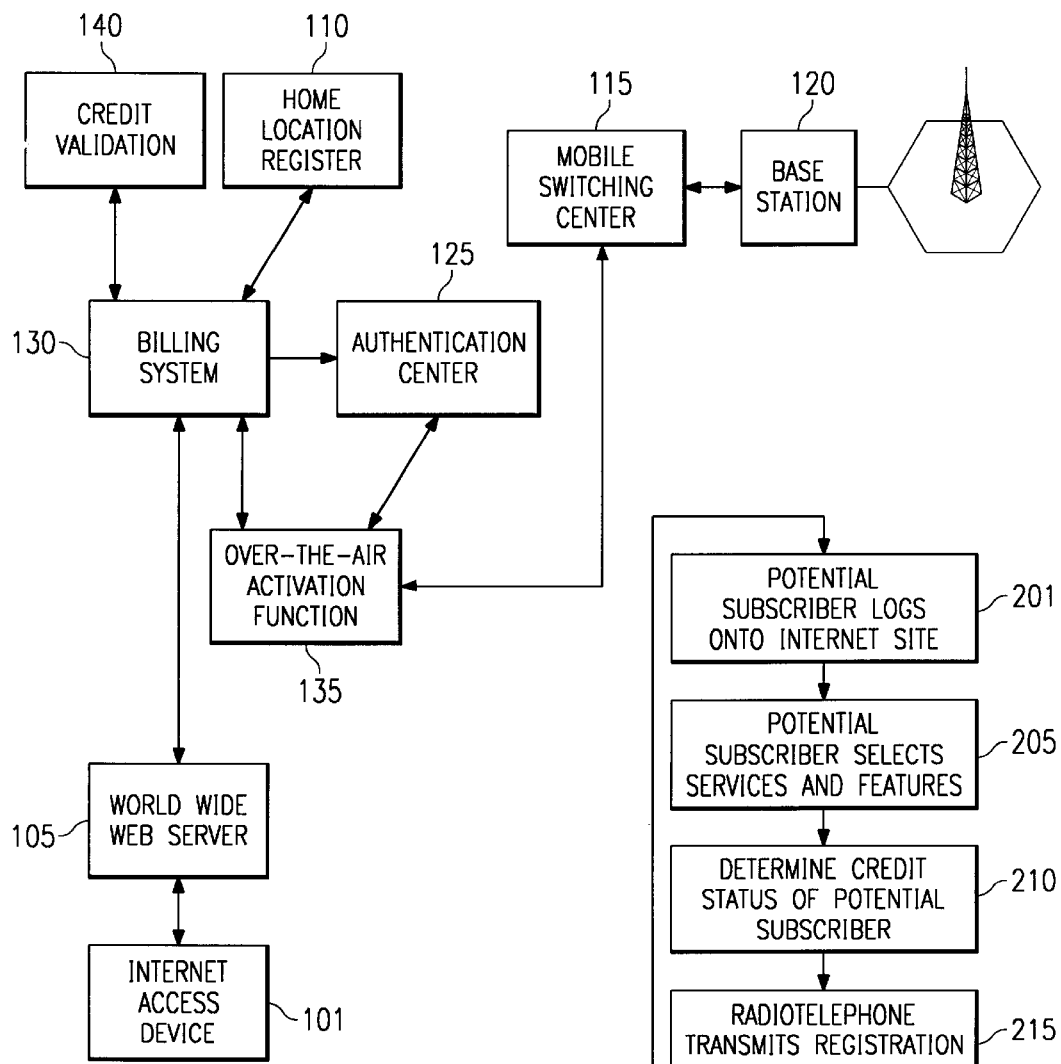
FIG. 1 shows a block diagram of an over-the-air radiotelephone activation system of the present invention.

The system of the present invention is illustrated in FIG. 1. In the preferred embodiment, the internet access device (101) is a desktop computer running a world wide web access program referred to as a web browser. An example of a computer used in the present invention is one of the APPLE MACINTOSH line of computers. These computers run web browsers such as NETSCAPE NAVIGATOR and MICROSOFT EXPLORER. Other brands and types of computers and other web browsers may be used by the present invention.

Alternate embodiments use other types of internet access devices such as dedicated smart terminals that have the ability to access the internet. An example of such a dedicated terminal is a telephone that has a built-in display and web browser giving it the ability to access the internet.

The internet access device (101) is coupled to the world wide web server (105) through the internet. This is done using a modem and connecting to the internet using an internet service provider. Other embodiments use other connections to the internet such as an Integrated Services Digital Network (ISDN) line that provides greater access speed.

The world wide web server (105) is a computer running server routines that are well known in the art. Hewlett Packard, Inc. and International Business Machines, Inc. (IBM) are manufacturers of dedicated servers. Additionally, a desktop computer operating the proper software may be configured as a server.

The web server (105) acts as a firewall to the system, limiting access to authorized users who have the proper identification information. In the preferred embodiment, the server (105) stores the web pages required by the processes of the present invention.

The billing system (130), coupled to the web server (105) is a billing server computer that performs billing processes, keeps records on the subscribers in the service provider's system, and sends the selected radiotelephone service features to a home location register (HLR) (110). The billing processes include tracking the subscriber's service plan and air time rates, tracking the subscriber's air time, and tracking the features that the subscriber has chosen. All of these factors enter into the bill that the subscriber receives. Therefore, if the subscriber changes his profile, the billing system must know in order to change the billing for the subscriber.

When a potential subscriber is entered into the billing system (130), it may be determined if the potential subscriber has credit that is good enough for the service provider or if the potential subscriber's credit card information is accurate and the proper credit exists. The billing system (130), therefore, sends the identification information entered by the potential subscriber to the credit validation system (140) to determine the potential subscriber's credit status. The credit validation system (140) then sends back the results to the billing system (130).

The credit validation system (140) is coupled to the billing system (130). In the preferred embodiment, the credit validation system (140) is a credit bureau that compiles consumer credit records for purchase by other companies. The billing system (130) is coupled to the credit validation system (140) over a wireline telephone link or trunks. Alternate embodiments use other forms of connecting such as with a satellite link.

The billing system (130) may additionally set up and manage prepaid air time. If the potential subscriber does not pass the credit check or if that person just desires to pay for blocks of time, the system can charge the potential subscriber's credit card for a certain amount. That amount can then be applied to the subscriber's account to be applied to the air time used by the subscriber. Once the prepaid amount is reduced to a certain threshold, the billing system may automatically charge the credit card again for a set amount.

The billing system (130) is coupled to the world wide web server (105) and the HLR (110) by ethernet connections. Other embodiments couple these components by other connections such as radio frequency or microwave, thus allowing the billing system (130) to be removed from the other system components by greater distances.

The authentication center (125), coupled to the billing system (130), is used to reduce the occurrence of fraudulent radiotelephone usage. The authentication center (125) is comprised of a processor that detects if a radiotelephone, that is to be set up for cellular service, has been cloned from another radiotelephone.

The authentication center (125) also generates an authentication key for use by the radiotelephone. In the future, when the radiotelephone tries to register with the system, this data is compared with the encryption data stored in the authentication center (125) to determine if the radiotelephone's directory number and electronic serial number have been copied from another radiotelephone. The authentication process is well known in the art and is not discussed further.

The over-the-air activation function (OTAF) (135) is coupled to the billing system (130), the authentication center (125), and the MSC (115). The OTAF (135) is comprised of a processor that enables a new radiotelephone to be programmed such that it can access the service provider's system.

The HLR (110) is well known in the art. It is a database of profiles for all of the radiotelephones operating in a particular service provider's system. The profiles include the features purchased by the subscriber.

The mobile switching center (MSC) (115) is also well known in the art. The MSC (115) is responsible for routing calls from the public switched telephone network (PSTN) to the appropriate base station (120) communicating with the subscriber's radiotelephone. The MSC (115) also performs the reverse task of routing a call from the radiotelephone to the PSTN.

The MSC (115) additionally performs the switching required by any of the features selected by the subscriber. Assume, for example, that the subscriber has purchased call forwarding. The subscriber enters into their radiotelephone the telephone number to which all incoming calls are to be forwarded. This information is transmitted to and stored in the HLR. When a call is received for the subscriber's radiotelephone number, the MSC finds the forwarding number in the profile received from the HLR and routes the call to the PSTN, or other MSCs, depending on the forwarding number.

Figure 2:
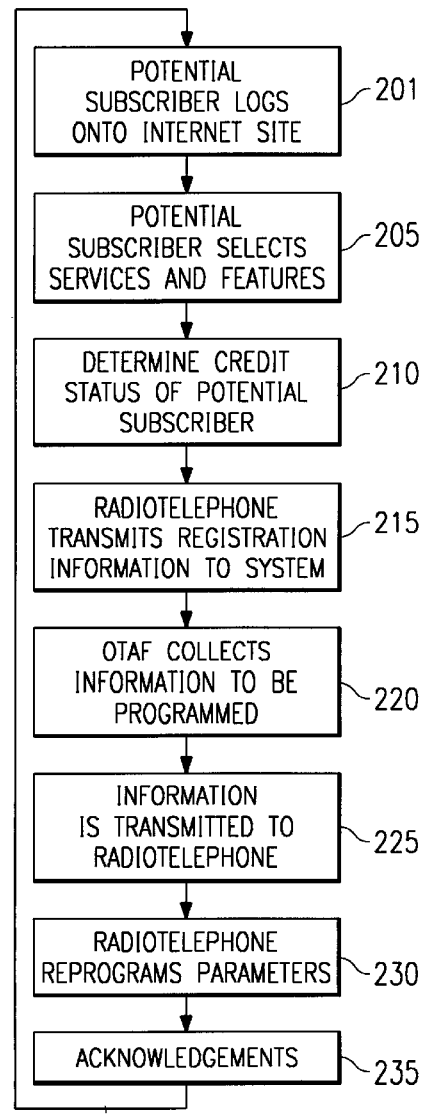
FIG. 2 shows a flowchart of an over-the-air activation process of the present invention in accordance with the system of FIG. 1.

FIG. 2 illustrates a flowchart of a process for the operation of the system of FIG. 1. This process takes the information entered by the potential subscriber, determines creditworthiness of the potential subscriber and then programs the radiotelephone with the appropriate data required to operate in the service provider's system.

The process begins with the potential subscriber logging on to the service provider's internet coupled world wide web server (step 201). A successful logging on operation brings up a web page, illustrated in FIG. 3, on the potential subscriber's computer or other internet access device. This page includes such items as the potential subscriber's name (301), radiotelephone manufacturer name (305), and various menu items (310-317). Subsequent web pages collect financial information such as credit card number and model number of the radiotelephone to be programmed. Alternate embodiments use other web page formats to enter similar information.

Figures 3, 6:
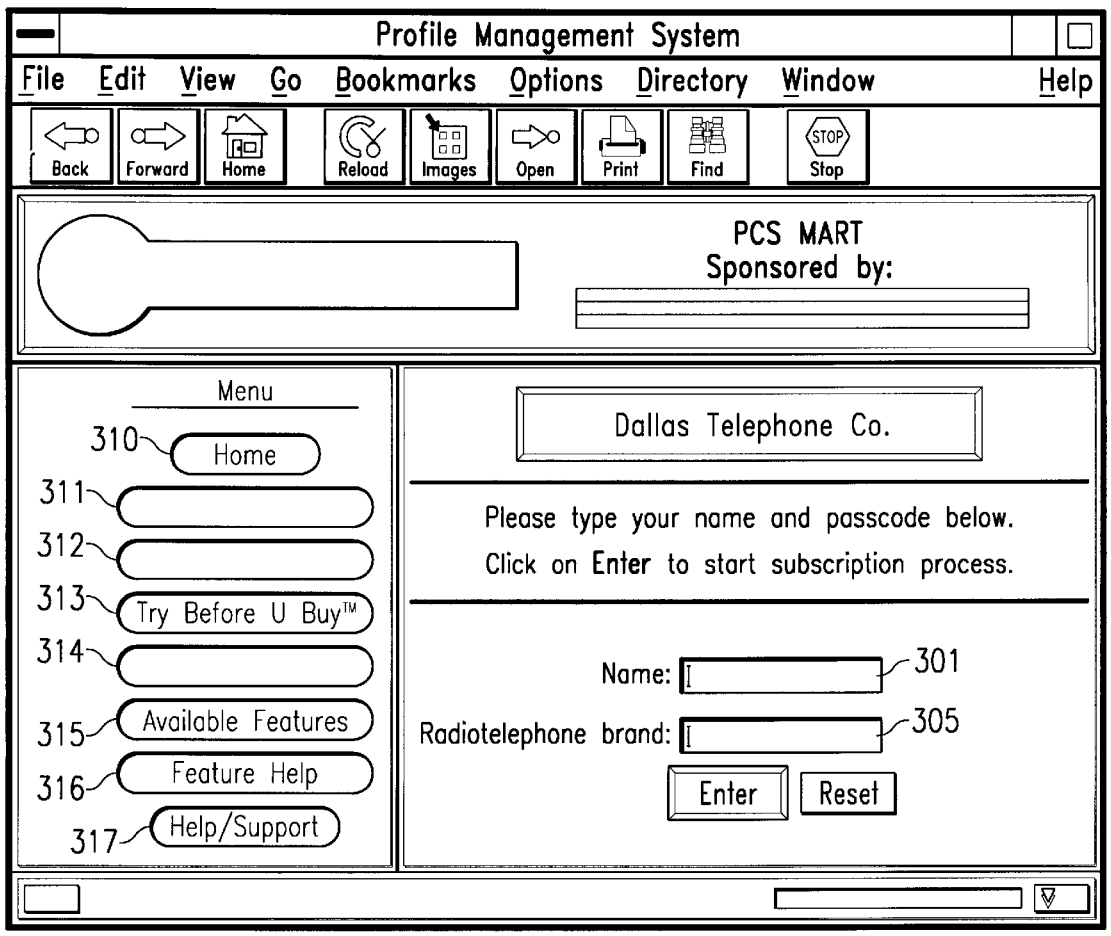
FIG. 3 shows an over-the-air activation login page.
FIG. 6 shows another profile management feature selection page.

After logging into the system, the potential subscriber is presented with the pages illustrated in FIGS. 5 and 6 enabling the subscriber to choose various service plans and features (step 205). These features and the process of selecting them are described subsequently in detail. These web pages are examples of possible formats and selectable information. Alternate embodiments use other web pages to achieve the same results.

The billing system, in conjunction with the credit validation system, determines the credit status of the potential subscriber (step 210). In the preferred embodiment, radiotelephone service is not provided until the credit status of the potential subscriber is verified.

After the potential subscriber is finished entering the above information and the credit check is complete, the entered information is stored as the subscriber profile in the billing system. The billing information is stored in the billing system server and the service and feature information is stored in the HLR.

The web page then instructs the user to power up the radiotelephone. The radiotelephone transmits its temporary directory number and electronic serial number to the system during the registration process (step 215).

A new radiotelephone, prior to being programmed for operation, contains a temporary directory number. When the radiotelephone is first powered up, the temporary directory number is transmitted to the base station (120) and then to the MSC (115).

The MSC (115) normally accesses the HLR (110) for the subscriber's profile when it receives a directory number. However, since the temporary directory number is not in the HLR, the MSC knows that the received number is one of a block of numbers that are for temporary use in radiotelephones that have not been programmed. This causes the MSC (115) to access the OTAF (135) (step 220) over an IS-41 link, sending to the OTAF (135) the data received from the radiotelephone such as the temporary directory number, the radiotelephone's electronic serial number, and any authentication data transmitted by the radiotelephone. The OTAF (135) collects the potential subscriber's profile, including the radiotelephone's permanent directory number, from the billing system (130) and the authentication data, assigned to the radiotelephone, from the authentication center (125). The OTAF (135) then sends this information to the MSC (115), over the IS-41 link, for transmission to the radiotelephone (step 225). Alternate embodiments use other protocol links between the OTAF (135) and the MSC (115).

The radiotelephone receives the transmitted information and stores it in the appropriate internal registers to update the various parameters that are reprogrammed from the initial state (step 230). These parameters include the permanent directory number, alternate directory numbers, authentication information, and system identification.

The process of the present invention then goes through a series of acknowledgments (step 235). First the radiotelephone sends an acknowledgment to the MSC (115) indicating that the information was received and the various parameters in the radiotelephone were updated. The MSC (115) sends an acknowledgment to the authentication center (125) that the programming was accomplished. The authentication center (125) sends the acknowledgment to the billing system (130) and the billing system (130) sends the acknowledgment to the provider of the world wide web page.

Figure 7:
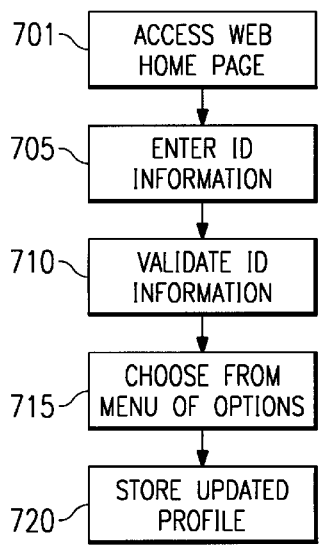
FIG. 7 shows a flowchart for the feature selection process of the present invention.

FIG. 7 illustrates the process followed by the subscriber to create and manage his radiotelephone service profile. This process is described with reference to FIGS. 4–6.

Figure 4:
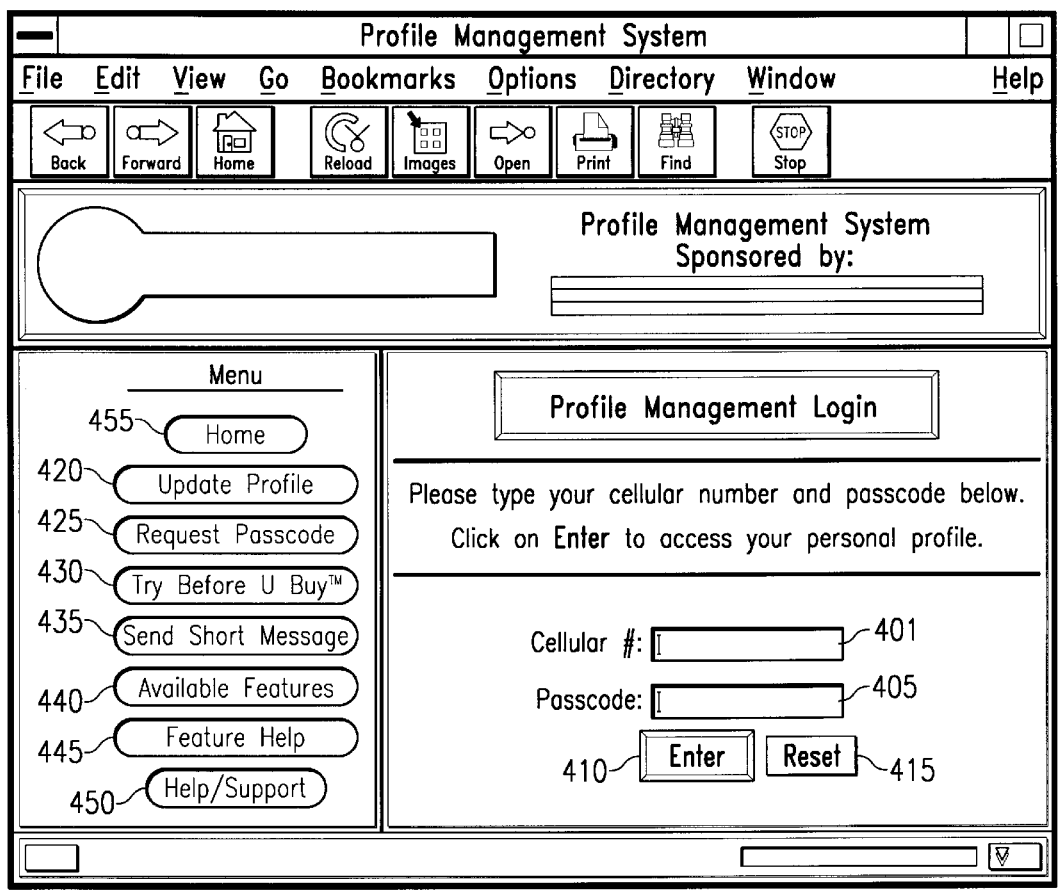
FIG. 4 shows a profile management login page.

Assuming the web browser program is running, the subscriber accesses the service provider's profile management home page (step 701). An example of such a page is illustrated in FIG. 4. This page is also referred to as the login page.

The home page includes areas for entering subscriber identification information. In the preferred embodiment, this information includes the cellular radiotelephone's assigned telephone number (401) and a password (405) known only to the subscriber. This password may be numeric, alphabetic, or alphanumeric.

Once the identification information is entered (step 705), the subscriber clicks on the enter key (410). If the information was not entered correctly, the reset key (415) may be used to clear the entries to allow re-entry of the information.

In the preferred embodiment, the identification information is validated (step 710) by the web server. The validation process is accomplished by the server comparing from a table, stored in memory or on a drive, the radiotelephone number with a password. If the radiotelephone number and password from the table is the same as the identification information entered by the subscriber, access to the profile management system is granted.

Once access is granted, a window (not shown) within the web page of FIG. 4 announces the successful access. If the radiotelephone number and password do not match, this is announced and another chance is given to enter the proper information.

The main profile management page additionally presents the subscriber with a menu of options. After successful access to the system, these buttons are enabled allowing the subscriber to choose an option (step 715).

In the preferred embodiment, these buttons are for a Home Page (455), Updating a Profile (420), Request Password (425), Try Before U Buy feature (430), Send Short Message (435), Available Features (440), and Help buttons (445 and 450). Not all of these buttons are subsequently discussed since some of the functions are well known by those skilled in the art. Additionally, the present invention is not limited to the buttons/functions shown in FIG. 4. Alternate embodiments have buttons for other functions not illustrated.

As an example of one function, if the "Update Profile" button (420) is activated, the web page illustrated in FIG. 5 is opened. This page shows the present service plan and features to which the subscriber has subscribed. By clicking on the appropriate boxes/buttons with the cursor, the subscriber can change his service plan including: rates, long distance carrier, and access to roaming. Additionally, basic features can be added or removed from the subscriber's profile by activating the appropriate box or button. Alternate embodiments list other features and use different formats.

Some features have sub-functions, as illustrated in FIG. 6, that also may be changed by the present invention. For example, if call forwarding is activated, another web page is displayed that illustrates information needed for call forwarding, such as: unsolicited calls received, the telephone is busy, there is no answer by the subscriber. In all of these cases, the subscriber can alter his profile by simply activating the appropriate button/box.

Another example of a function from the home page is the Try Before U Buy (430) function. This function enables the subscriber to try out a feature or service before being billed for it.

For example, if the subscriber wanted to find out if the call waiting feature would be useful as part of his service, he would activate the Try Before U Buy button (430), illustrated in FIG. 4, that would bring up the same web page illustrated in FIG. 5. The difference is that the features and services are not charged to the subscriber's account for a predetermined time. This time gives the subscriber a chance to try the features before actually purchasing them.

If, after the predetermined time, the subscriber doesn't re-enter the web page and make the new features permanent, the features are turned off. However, if the subscriber desires these features, the web pages can be reaccessed and the features added to the account.

Referring again to FIG. 6, if a mistake is made during the entry of any of the above changes, the subscriber can activate the Reset button (601) to clear out any changes and return to the original profile. Once the subscriber has correctly altered his profile as needed, the Submit button (602) is activated.

Activation of the Submit button (602) informs the web server to format the new profile into the appropriate delimited format. The preferred formatting is done using a protocol. Other embodiments use some type of delimiting such as tabs or semicolons. The profile is then submitted to the HLR over the provisioning interface for storage (step 720) and use by the MSC.

In summary, the system and processes of the present invention enable a potential subscriber to activate radiotelephone service using the internet. By using a computer to access the service provider's web page, the potential subscriber can create his profile quicker and at any time of the day without operator interaction. The present invention, therefore, saves the service provider money by reducing the number of operators required and potentially increasing the subscriber base by increasing the ease and flexibility of initiating service.

I claim:

1. A system for utilizing the Internet to request a subscription to radiotelephone service or to change a current radiotelephone service subscription, the radiotelephone being programmable to provide the requested service in response to its receipt of a wireless programming signal, the service requester having access to the internet via an internet access device, the system comprising:

an internet web server connected to the internet for
(i) presenting to the requester a sensible listing of radiotelephone services and features in response to being accessed by the internet access device, the services and features being selectable by the requester's manipulation of the internet access device, and (ii) providing queries to the requester which require the requester to provide selected authentication data and credit data via the internet access device concerning the requester and the radiotelephone;

a billing server for receiving credit data from the web server, and then, if the credit data is veracious, storing the service and feature selections made by the requester, the billing server being adapted to also accumulate and store billing data related to the use of the radiotelephone with the selected services and features;

a radiotelephone switching center, which is connectable to wire and wireless telephone networks, for (i) receiving the service and feature selections stored by the billing server, and, (ii) effecting and performing the selected services and features as it routes communications to and from the radiotelephone over the networks in response to both (a) an authentication signal and (b) the requester attempting to use the radiotelephone to place or receive a communication over the networks;

an authentication center for providing the authentication signal if the authentication data presented by the requester is veracious; and a radiotelephone activator in communication with the billing server and the switching center and responsive to the authentication signal for sending a wireless programming signal to the radiotelephone upon initial activation thereof with the selected features and services, the wireless signal appropriately programming the radiotelephone to provide the selected services and features that coincide with those received by the billing server and the switching center.

* * * * *